US007902325B2

(12) United States Patent
Blackmon et al.

(10) Patent No.: US 7,902,325 B2
(45) Date of Patent: Mar. 8, 2011

(54) POLYPROPYLENE HAVING REDUCED RESIDUAL METALS

(75) Inventors: Kenneth P. Blackmon, Houston, TX (US); Mark C. Douglass, League City, TX (US); Kevin P. McGovern, Houston, TX (US); Mark Miller, Houston, TX (US); Joseph D. Thorman, League City, TX (US)

(73) Assignee: Fina Technology, Inc., Houston, TX (US)

( * ) Notice: Subject to any disclaimer, the term of this patent is extended or adjusted under 35 U.S.C. 154(b) by 1141 days.

(21) Appl. No.: 11/473,358

(22) Filed: Jun. 22, 2006

(65) Prior Publication Data

US 2006/0293504 A1 Dec. 28, 2006

Related U.S. Application Data

(60) Provisional application No. 60/693,298, filed on Jun. 23, 2005.

(51) Int. Cl.
*C08F 6/02* (2006.01)
*C08F 110/06* (2006.01)

(52) U.S. Cl. ........................ 528/498; 528/495; 528/496
(58) Field of Classification Search ................. 528/495, 528/496, 497, 498
See application file for complete search history.

(56) References Cited

U.S. PATENT DOCUMENTS

| 3,001,976 | A | * | 9/1961 | Langer, Jr. et al. | 528/496 |
| 3,415,799 | A | * | 12/1968 | Helm | 528/489 |
| 3,499,880 | A | * | 3/1970 | Kutner | 528/486 |
| 3,803,113 | A | * | 4/1974 | Gluntz et al. | 528/482 |
| 4,065,610 | A | * | 12/1977 | De Beukelaar et al. | 526/70 |
| 4,384,087 | A | | 5/1983 | Capshew | |
| 5,733,980 | A | | 3/1998 | Cozewith | |
| 6,831,032 | B2 | * | 12/2004 | Spaether | 502/103 |
| 2003/0050411 | A1 | | 3/2003 | Gaynor | |

* cited by examiner

*Primary Examiner* — Fred M Teskin
(74) *Attorney, Agent, or Firm* — Tenley R. Krueger

(57) ABSTRACT

Polymerization processes are described herein. The polymerization processes generally include introducing a catalyst system to a reaction zone, introducing an olefin monomer to the reaction zone, contacting the olefin monomer with the catalyst system to form a polyolefin and contacting the polyolefin with a quench agent, wherein the quench agent is at least partially soluble in the olefin monomer.

6 Claims, No Drawings

POLYPROPYLENE HAVING REDUCED RESIDUAL METALS

CROSS-REFERENCE TO RELATED APPLICATIONS

This application claims the benefit of U.S. Provisional Patent Application Ser. No. 60/693,298, filed Jun. 23, 2005.

FIELD

Embodiments of the present invention generally relate to polyolefins. In particular, embodiments of the present invention generally relate to polyolefins having reduced residual metal or catalyst system components levels.

BACKGROUND

Polymerization processes generally include contacting monomers with a catalyst system to form polymers.

Unfortunately, the formed polymers include a level of metals resulting from catalyst system residues (i.e., residual level.) For example, these residues may include aluminum, magnesium or titanium, for example. While the level of residues may be acceptable for some applications, certain applications require a residual level that is lower than that achieved by conventional processes.

Therefore, a need exists to develop a polymerization process resulting in polymers having reduced residual levels.

SUMMARY

Embodiments of the present invention include polymerization processes. The polymerization processes generally include introducing a catalyst system to a reaction zone, introducing an olefin monomer to the reaction zone, contacting the olefin monomer with the catalyst system to form a polyolefin and contacting the polyolefin with a quench agent, wherein the quench agent is at least partially soluble in the olefin monomer.

Embodiments further include processes for reducing a residual metal level in polypropylene. The processes generally include providing a first polypropylene, wherein the first polypropylene includes a first aggregate residual metal level that is at least 60 ppm and contacting the first polypropylene with a quench agent to form a second polypropylene. The second polypropylene generally includes a second aggregate residual metal level that is about 40 ppm or less.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" refers to the weight of product produced per weight of the catalyst used in a process per hour of reaction at a standard set of conditions (e.g., grams product/gram catalyst/hr).

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. A brief discussion of such catalyst systems is included below, but is in no way intended to limit the scope of the invention to such catalysts.

Ziegler-Natta catalyst systems are generally formed from the combination of a metal component (e.g., a potentially active catalyst site) with one or more additional components, such as a catalyst support, a cocatalyst and/or one or more electron donors, for example.

A specific example of a Ziegler-Natta catalyst includes a metal component generally represented by the formula:

wherein M is a transition metal, R is a halogen, an alkoxy, or a hydrocarboxyl group and x is the valence of the transition metal. For example, x may be from 1 to 6.

The transition metal may be selected from Groups IV through VIB (e.g., titanium, chromium or vanadium), for example. R may be selected from chlorine, bromine, carbonate, ester, or an alkoxy group in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator, which is also referred to in some instances as a "cocatalyst." Embodiments of such Z-N activators include organoaluminum compounds, such as trimethyl aluminum (TMA), triethyl aluminum (TEAl) and triisobutyl aluminum (TiBAl), for example.

The cocatalyst is generally added to the process and/or the catalyst in an amount defined as the cocatalyst ratio. As used herein, the term "cocatalyst ratio" is generally defined as the weight of cocatalyst (e.g., in lbs) divided by 1000 lbs of monomer. Specifically, the cocatalyst ratio (described herein as the TEAL cocatalyst ratio) described in the particular embodiments herein refer to the weight of TEAl cocatalyst (15 wt.% in hexane) divided by 1000 lbs of monomer. The conventional TEAL cocatalyst ratio may be from about 0.4 to about 1.6, or from about 0.5 to about 1.4 or from about 0.8 to about 1.3.

However, embodiments of the invention (which may or may not be utilized in combination with other embodiments described herein) may include utilizing a cocatalyst ratio that is lower than previously utilized. Such embodiments include a cocatalyst ratio that is from about 15% to about 30% lower than that of an identical conventional process (e.g., from about 0.3 to about 0.7). While discussed herein in terms of TEAl cocatalysts, it is contemplated that other cocatalysts or combinations of catalyst may be utilized in amounts that are from about 15% to about 30% lower than that known to one skilled in the art. Such a reduction in the cocatalyst ratio results in a reduction in the residual level (discussed in further detail below and used interchangeably with catalyst residual level and residual metals level), while maintaining sufficient catalyst activity. For example, the residual metal level in the polymer (e.g., aluminum) may be reduced by from about 15% to about 30%.

The Ziegler-Natta catalyst system may further include one or more electron donors, such as internal electron donors and/or external electron donors. Internal electron donors may be used to reduce the atactic form of the resulting polymer, thus decreasing the amount of xylene soluble material in the polymer. The internal electron donors may include amines, amides, esters, ketones, nitriles, ethers, phosphines, diethers, succinates, phthalates, or dialkoxybenzenes, for example. (See, U.S. Pat. Nos. 5,945,366 and 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CMDS), diisopropyldimethoxysilane (DIDS) and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide, or silica, for example.

The Ziegler-Natta catalyst may be formed by any method known to one skilled in the art. For example, the Ziegler-Natta catalyst may be formed by contacting a transition metal halide with a metal alkyl or metal hydride. (See, U.S. Pat. Nos. 4,298,718, 4,298,718, 4,544,717, 4,767,735, and 4,544, 717, which are incorporated by reference herein.)

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525,678, 6,420, 580, 6,380,328, 6,359,072, 6,346,586, 6,340,730, 6,339,134, 6,300,436, 6,274,684, 6,271,323, 6,248,845, 6,245,868, 6,245,705, 6,242,545, 6,211,105, 6,207,606, 6,180,735 and 6,147,173, which are incorporated by reference herein.)

In certain embodiments, the processes described above generally include polymerizing olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbomene, nobomadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

The polymerization processes may further include contacting the polymer with a catalyst quench agent. As used herein, the term "quench agent" refers to a compound capable of terminating a polymerization reaction. Such quench agents may include a compound such as alcohols or water, for example.

Contact with the quench agent may occur at any time or in any manner known to one skilled in the art. For example, such contact may occur during the polymerization process prior to removal of the polymer therefrom or may occur upon removal of the polymer from the polymerization process, for example.

Unfortunately, the formed polymers include a level of metals (i.e., residual level) resulting from catalyst system residues. For example, these metals may include aluminum, magnesium or titanium, for example. As used herein, the term "residual level" generally refers to the aggregate level of residual metals present in the polymer. Particular metal residual levels are referred to herein as such, e.g., aluminum residual level.

While the residual level may be acceptable for some applications, certain applications require a residual level that is lower than that achieved by conventional processes. For example, the formed polymers may include at least about 2 ppm of Mg, at least 20 ppm of Cl, at least 30 ppm of Cr and/or at least 30 ppm of Al.

Embodiments of the invention include utilizing monomer (e.g., propylene for polypropylene) soluble alcohols, such as isopropanol (IPA), as the quench agent. Unexpectedly, such contact results in a reduction in residual levels compared to embodiments utilizing other compounds as the quench agent. For example, the aluminum residual level may be reduced to about 40 ppm or less.

Polymerization processes may further include contacting the polymer with a washing agent. Such contact may occur by any method known to one skilled in the art, such as in a wash column, for example. In one embodiment, the washing agent contacts the polymer in a flow that is countercurrent to the flow of the polymer.

One or more embodiments include utilizing additional monomer (e.g., propylene for polypropylene) as the wash agent. The additional monomer may contact the polymer in an amount that is from about 0% to about 25% of the additional monomer feed rate, for example. In addition, the additional monomer may contact the polymer for a time of from about 10 minutes to about 15 minutes, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

The polymers (and blends thereof) formed via one or more of the embodiments described herein result in an unexpected reduction in residual metals compared to processes not employing such embodiments. For example, the polymers may include an aggregate residual level of about 60 ppm or less, or 50 ppm or less, or 40 ppm or less, or 32 ppm or less or 25 ppm or less. The polymers may further include an aluminum residual level of about 40 ppm or less, or about 35 ppm, or about 30 ppm or less, or about 25 ppm or less or about 20 ppm or less, for example.

In one embodiment, the polymers include polypropylene. The propylene polymers may have a melt index (MI) of from about 0.01 dg/min to about 1000 dg/min., or from about 0.01 dg/min. to about 100 dg/min., or from about 0.02 dg/min. to about 50 dg/min., or from about 0.03 dg/min. to about 10 dg/min. or from about 3.0 to about 5.0, for example. As used herein, "melt flow index" is measured via ASTM-D-1238-E. Unless otherwise designated herein, all testing methods are the current methods at the time of filing.

The propylene polymers may further have a melting point of at least about 125° C., or from about 125° C. to about 170° C. or from about 150° C. to about 167° C., for example.

In addition, the propylene polymers may hold about 6 wt.% or less, or about 5 wt.% or less or about 4 wt.% or less of xylene soluble material, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example. In one embodiment, the polymers are used in opaque film applications.

In particular, the polymers (and blends thereof) formed via the embodiments described herein are useful in applications requiring a reduced residual level. For example, the polymers are useful in opaque film applications, such as food packaging, cigarette wrapping, stationary lamination, shrink wrap and industrial laminates, for example. The reduced residual level in the polymer generally results in reduced degradation during the film production process.

EXAMPLES

In the following examples, samples of polypropylene were produced.

All polymerizations included contacting propylene monomer with a Ziegler-Natta catalyst within a loop reaction vessel to form polypropylene having a melt flow of 2.8 g/10 min and a xylene solubles content of 2.5 wt.%. The polymerization further included introducing TEAl (15% in hexane) as cocatalyst into the reaction vessel. The cocatalyst ratio of each run is shown in the table below.

Each polymerization further included utilizing isopropyl alcohol to quench the polymerization reaction.

Samples 1-6 further included passing the polypropylene through a wash column. Propylen monomer was also added to the wash column at a rate of 14,000 lb/hr.

TABLE 1

| Sample | Cocatalyst Ratio | Al (ppm) | Mg (ppm) |
| --- | --- | --- | --- |
| 1 | 0.7 | 32.3 | 5.96 |
| 2 | 0.7 | 34.2 | 5.15 |
| 3 | 0.65 | 26.8 | 8.77 |
| 4 | 0.65 | 24.3 | 8.66 |
| 5 | 0.65 | 26.3 | 8.55 |
| 6 | 0.65 | 33.3 | 7.99 |

Unexpectedly, the production process improvements of the present invention successfully result in a reduced residual level of less than 40 parts per million in the final polyproplene product. In particular, utilizing isopropyl alcohol as the quench agent resulted in a polymer monomer aluminum residual level of less than 40 ppm. Further, washing the polymer with proylene monomer resulted in a further reduction of the aluminum residual level of about 20%.

While the foregoing is directed to embodiments of the present invention, other and further embodiments of the invention may be devised without departing from the basic scope thereof and the scope thereof is determined by the claims that follow.

What is claimed is:

1. A polymerization process comprising:
   introducing a catalyst system to a reaction zone comprising a loop reactor;
   contacting the catalyst system with a cocatalyst at a catalyst system to cocatalyst ratio of from about 0.3:1 to about 0.7:1;
   introducing propylene to the reaction zone;

contacting the propylene with the catalyst system to form polypropylene via a polymerization reaction, wherein the polypropylene comprises a first aggregate residual metal level that is at least 60 ppm;

contacting the polypropylene with a quench agent to terminate the polymerization reaction, wherein the quench agent is at least partially soluble in the propylene; and contacting the polypropylene with a wash agent comprising propylene to form a polypropylene having a second level of residual metals that is about 40 ppm or less.

2. The process of claim 1, wherein the wash agent contacts the polypropylene after contact with the quench agent without treatment therebetween.

3. The process of claim 1, wherein the quench agent comprises isopropanol.

4. The process of claim 1, wherein the catalyst system comprises a Ziegler-Natta catalyst system.

5. The process of claim 1, wherein the first aggregate residual metal level is formed of residual metals comprising aluminum, magnesium, titanium or combinations thereof.

6. The process of claim 1, wherein the metal levels comprise an aluminum residual level.

* * * * *